United States Patent [19]

Hoiss

[11] Patent Number: 4,585,524
[45] Date of Patent: Apr. 29, 1986

[54] METHOD AND APPARATUS FOR DISTILLATION OF CRUDE WATER

[76] Inventor: Jakob Hoiss, Waldhornstrasse 31, Munich 50, Fed. Rep. of Germany, D-8000

[21] Appl. No.: 506,230

[22] Filed: Jun. 22, 1983

Related U.S. Application Data

[63] Continuation of Ser. No. 6,224, Jan. 24, 1979, abandoned, which is a continuation of Ser. No. 756,841, Jan. 5, 1977, abandoned.

[30] Foreign Application Priority Data

Jan. 7, 1976 [DE] Fed. Rep. of Germany ....... 2600398

[51] Int. Cl.$^4$ .............................................. B01D 3/06
[52] U.S. Cl. ....................................... 203/11; 203/24; 203/23; 203/DIG. 4
[58] Field of Search ....................... 202/202, 204, 182; 203/21, 22, 24, 26, DIG. 4, 10, 11

[56] References Cited

U.S. PATENT DOCUMENTS 3,020,215  2/1962  Weber ................................. 202/197
4,045,293  8/1977  Cooksley ............................. 202/202
4,089,749  5/1978  Karamian ........................... 202/202

FOREIGN PATENT DOCUMENTS 1241174  7/1971  United Kingdom .................. 203/26

Primary Examiner—Hiram H. Bernstein
Attorney, Agent, or Firm—Peter K. Kontler

[57] ABSTRACT

Demineralized crude water is distilled during flow along a first path which is defined by stationary parts. Such water is evaporated and thereafter cooled and condensed by a heat transfer medium which is circulated along an endless second path. Evaporation of crude water results in condensation of the medium, and condensation of resulting water vapors into distillate results in evaporation of the medium. The medium is caused to pass through a heat pump which raises its pressure and temperature before the thus heated medium exchanges heat with and evaporates crude water in the first path. The medium and/or the distillate can be used for preheating crude water upstream of the evaporating station, and the vapors are preferably purified by one or more cyclones, by an electrostatic filter and/or by ultrasonic waves intermediate the evaporating and condensing stations.

16 Claims, 5 Drawing Figures

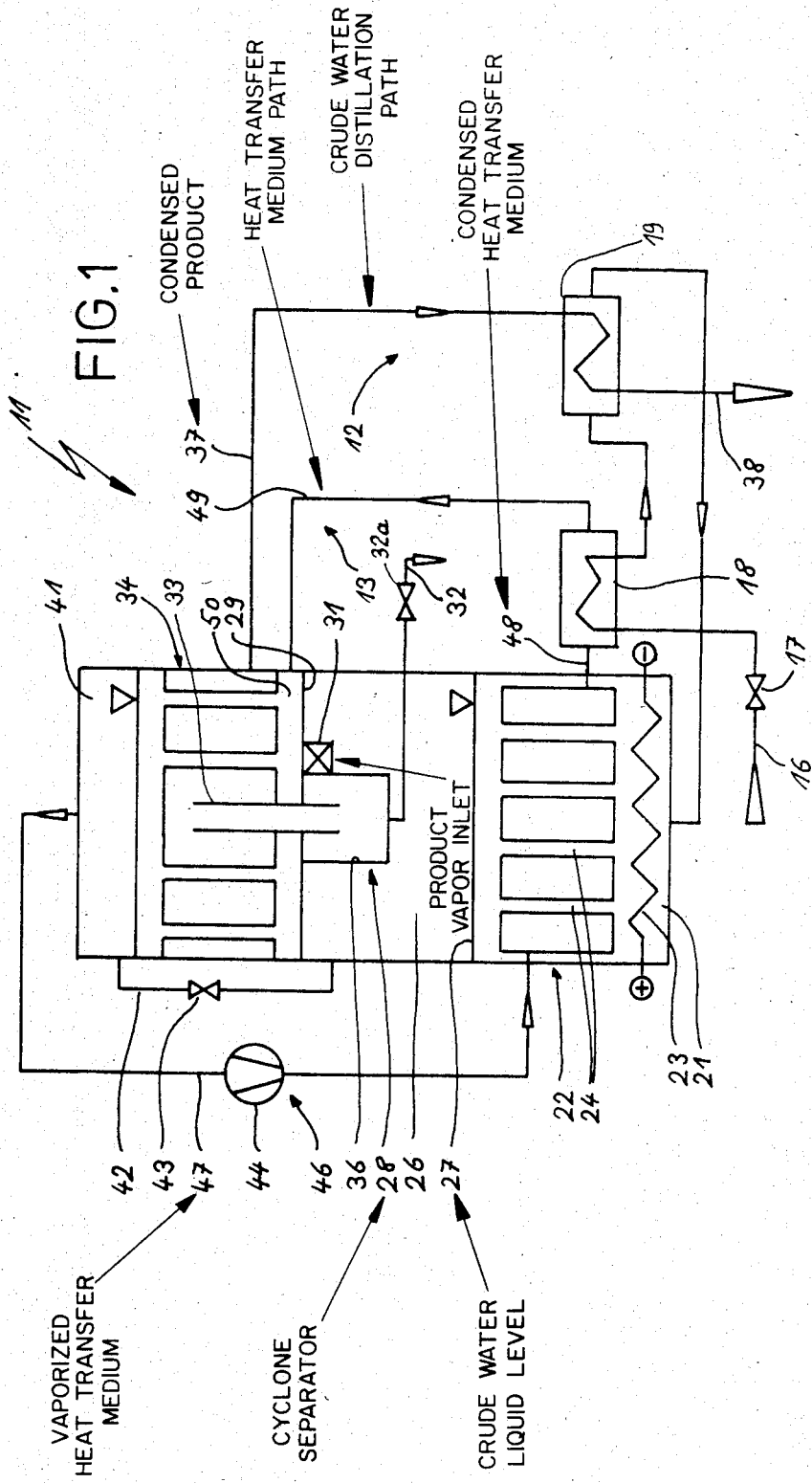

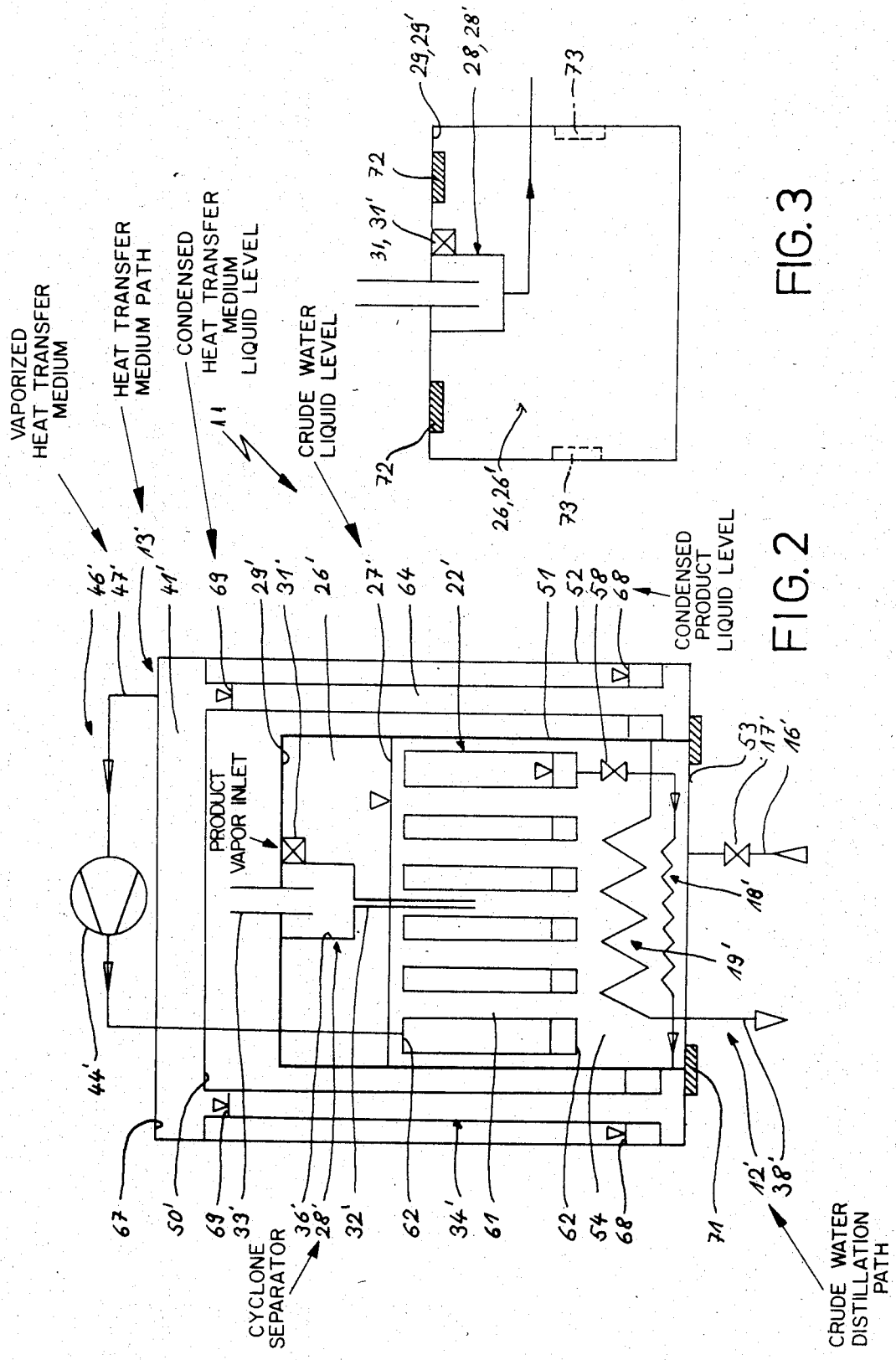

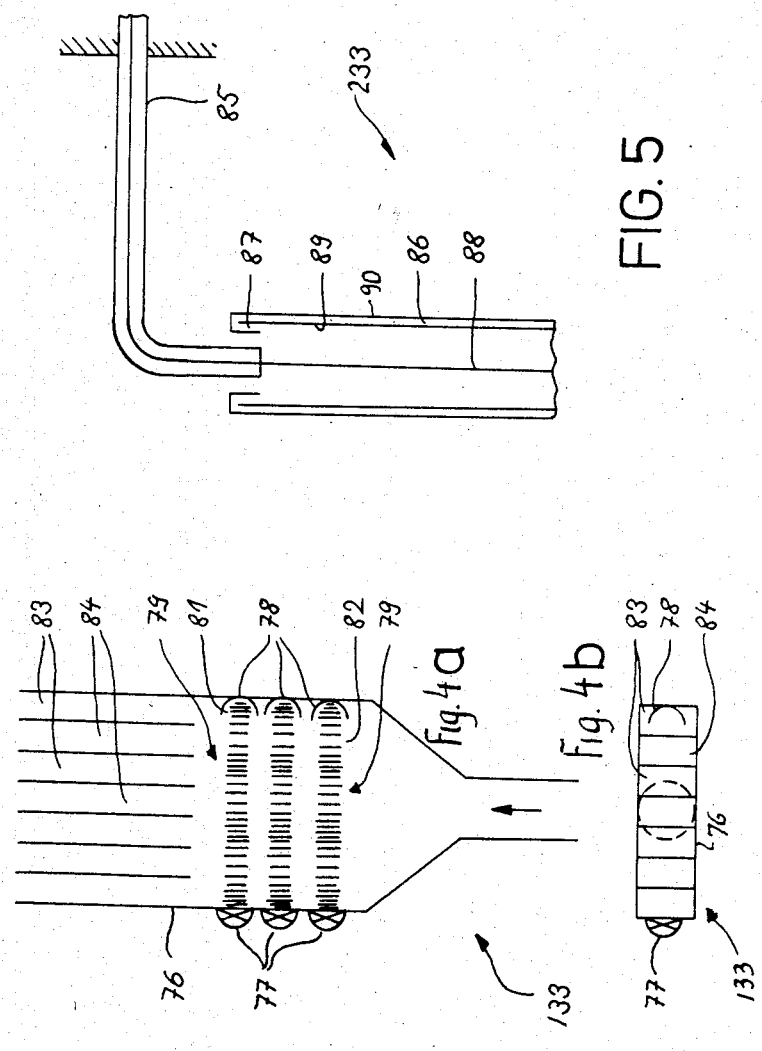

METHOD AND APPARATUS FOR DISTILLATION OF CRUDE WATER

This application is a continuation of application Ser. No. 006,224 filed Jan. 24, 1979, and now abandoned which was a continuation of application Ser. No. 756,841 filed Jan. 5, 1977, now abandoned.

BACKGROUND OF THE INVENTION

The present invention relates to a method and distilling of crude water, especially distilling of demineralized crude water.

In accordance with a presently known distillation technique (which is referred to as thermocompression), crude water is preheated by one or more heat exchangers, preferably to the boiling point. Distillate vapors are generated in an evaporator which is connected to the heat exchangers, and such vapors are sucked in by a compressor which increases the pessure of vapors to insure effective utilization of their evaporation enthalpy. As a result of such processing, the temperature of vapors increases so that the thus heated vapors can be used in the evaporator as a heating medium. The resulting distillate is caused to pass through and is cooled in the heat exchangers to thereby heat the crude water. Such method is economical; however, it exhibits the serious drawback that distillate must pass through the compressor (which can be said to constitute or form port of a heat pump). The compressor includes rotary parts which must be sealed from the surrounding atmosphere. Nevertheless, the seals for the moving parts are likely to allow the distillate to come into contact with germs of a bacterial nature, lubricant and abrasion material. Moreover, droplets of water which pass through the compressor with distillate vapors are likely to and normally contaminate the distillate.

In accordance with a conventional technique (known as thermodrive), vapors are relieved of water droplets by centrifugal force. Evaporation takes place in a tube serving to produce a spinning effect which results in centrifugal segregation of water droplets from vapors. Reference may be had to German Offenlegungsschrift No. 2,219,650, especially to FIGS. 4 and 5 of this pulication. FIG. 2 of the Offenlegungsschrift shows that energy is recovered primarily by resorting to several evaporation stages. Crude water is preheated in several condensers which are connected inseries and undergoes partial evaporation in a first evaporator in which it is maintained at a predetermined pressure (e.g., at a super-atmospheric pressure in the range of 3–7 bars). The non-evaporated portion is introduced into and is caused to partly evaporate, at a lower pressure, in aother evaporator. The remnant of crude water is caused to evaporate in the last stage. Distillate vapors of the first stage are used as a heating medium for the second stage, those of the second stage as a heating medium for the third stage, and so forth. Distillate vapors of the last stage are supplied to the first stage by way of a heat pump. If the evaporators are or include several centrifugal separators in the form of tubes which produce a spinning effect, the resulting distillate is purer than can be achieved by resorting solely to the aforediscussed thermocompression technique. However, the heat pump in the last stage is likely to pollute the distillate. In the absence of such heat pump, it is necessary to supply external energy which increases the cost of distillate.

Thus, the just described conventional distillation techniques cannot produce a distillate of satisfactory purity, except by resorting to centrifugal purification and multi-stage evaporation without a heat pump. In the absence of a heat pump, the distillate is much more expensive because it must be subjected to an additional heating action.

SUMMARY OF THE INVENTION

An object of the invention is to provide a relatively simple and inexpensive method of distilling crude water.

Another object of the invention is to provide a distilling method which does not exhibit the drawbacks of the aforediscussed prior art methods.

A further object of the invention is to provide a method which can be practiced for the production of distillate whose purity and/or quality greatly exceeds the purity and/or quality of distillates produced in accordance with conventional methods.

The invention resides in the provision of a method of distilling crude water, particularly demineralized (including desalted) crude water. The method comprises the steps of introducing crude water into and conveying such water along a first path which is defined (preferably exclusively) by stationary component parts, circulating an evaporable heating medium (such as crude water or a fluid other than water, e.g., a halogenated hydrocarbon such as Freon) along a separate endless second path, heating the medium by means of a heat pump, establishing an exchange of heat between the thus heated medium and crude water in a first portion of the first path to thereby heat crude water to evaporation temperature, and cooling the thus obtained vapors in a second portion of the first path to condensation temperature.

The cooling step preferably comprises establishing an exchange of heat between the medium and the vapors whereby the medium is heated to evaporation temperature. The medium is or may be cooled to condensation temperature in the course of evaporation of crude water. Crude water may be preheated in at least one additional portion of the first path upstream of the first portion, preferably by establishing an exchange of heat between crude water and the medium which is circulated along the second path and/or between crude water and condensed distillate.

The method may further comprise the step of heating crude water in the first portion of the first path by a source of heat (e.g., an electric heater) other than the medium in the second path, particularly during starting of the apparatus (i.e., during initial introduction of relatively cool crude water into the first path).

Since the vapors are ordinarily mixed with at least some waste water and/or othe impurities, the method preferably further comprises the step of purifying the vapors prior to condensation, and such purifying step includes separating waste water and/or other impurities from vapors. The purifying step may include conveying vapors through a cyclone and evacuating separated waste water from the first path or admitting separated waste water into the first portion of the first path. The vapors may be irradiated with sound waves prior to the purifying step, or the method may comprise the additional step of establishing and maintaining at least one standing sound wave in the path of purified vapors which issue from the cyclone. The purifying step may include passing the vapors through a cyclone and thereupon subjecting the vapors to th purifying action of an electrostatic filter.

As a rule, the vapors will include those which contain a relatively low and those which contain a relatively high percentage of water droplets; vapors which contain a relatively high percentage of droplets may be returned into the first portion of the first path.

The novel features which are considered as characteristic of the invention are set forth in particular in the appended claims. The improved method itself, however, together with additional features and advantages thereof, will be best understood upon perusal of the following detailed description of certain specific embodiments of apparatus for practice of the method with reference to the accompanying drawing.

BRIEF DESCRIPTION OF THE DRAWING

FIG. 1 is a schematic vertical sectional view of a first apparatus;

FIG. 2 is a similar schematic vertical sectional view of a second apparatus;

FIG. 3 shows the means for subjecting water vapors to the action of ultrasonic radiation;

FIG. 4 illustrates a device which purifies water vapors by generating several standing sound waves; and FIG. 5 illustrates an electrostatic filter for water vapors.

DESCRIPTION OF THE PREFERRED EMBODIMENTS

Referring to FIG. 1, there is shown an apparatus 11 for distillation of demineralized crude water. The apparatus 11 comprises a primary system or circuit 12 defining a first path wherein crude water is distilled and which (save for minor auxiliary equipment, such as one or more valves) does not have any moving parts, and a discrete self-contained secondary circulation system or circuit 13 defining an endless second path for a heat transfer medium. In this embodiment of the apparatus, the heat transfer medium which is circulated in the secondary system is demineralized crude water. Ordinary water, whih has been decalcified as much as possible, can be used just as well.

Crude water to be distilled is fed (e.g., from an ion exchanger) to the primary system 12 by way of a feed line or inlet conduit 16 which contains a float-operated switch, a solenoid-operated valve 17 or any other suitable means for achieving and maintaining in the apparatus 11 a constant or nearly constant filling height (see the liquid level 27). Crude water whch enters by way of the feed line 16 flows through and is subjected to preliminary heating in a heat exchanger 18 and thereupon in a further heat excnanger 19. The heat exchangers 18 and 19 preferably operate in accordance with the cross-current principle. The inflowing crude water is maintained at a temperature of approximately 25° C. and at a pressure slightly exceeding atmospheric pressure. In the heat exchanger 18, the temperature of crude water is raised to approximately 34° C. The ehat exchanger 19 raises the water temperature to approximately 94° C., and the thus heated crude water is admitted into the bottom chamber 21 of an evaporator or evaporating means 22 which contains a heating device 23, e.g., an electric heating rod (shown in FIG. 1) or a tube which conveys a current of steam. The eating device 23 raises the temperature of crude water to the boiling point (approximately 105° C.). Thus, the amount of heat energy which is supplied by the device 23 is relatively small; the basic purpose of the device 23 is to make up for the loss of energy in the entire apparatus 11. Nevertheless, it is preferred to employ a heating device which renders it possible to rapidly start the apparatus 11, i.e., to raise the temperature of crude water from 25° C. to te boiling point without any assistance from the heat exchanger 18 and/or 19.

Crude water which flows from the heat exchanger 19 into the bottom chamber 21 rises by passing through pipes 24 in the evaporator 22 (water in the pipes 24 is still in a liquid state) and enters a vapor chamber 26 where it is evaporated. The pipes 24 may but need not be concentric and need not be exactly vertical; also, such pipes cannot be replaced by or used together with plate heat exhangers. The upper level of liquid in the vapor chamber 26 is shown at 27; such level is preferably located slightly above the evaporator pipes 24. The valve 17 insures that the position of the upper level 27 of heated crude water in the vapor chamber 26 remains constant or nearly constant. The rate of evaporation is such that the ascending vapors cannot entrain large droplets of crude water.

The temperature of vapors in the chamber 26 is assumed to be 105° C., and th pessure is approximately 1.23 bars. At least one vapor purifying device in the form of a cyclone separator 28 is secured to the ceiling 29 of the vapor chamber 26 in such a position that it is located above the liquid level 27. The separator 28 (hereinafter called cyclone) may but need not be mounted concentrically with the chamber 26 and is preferably of the type which is capable of separating gases from solids and other non-gasiform substances. In the illustrated embodiment, the cyclone 28 has a substantially radially extending helical inlet 31 close to its top, and a waste water outlet 32 which communicates with the center of the bottom portion of the cyclone. The outlet 32 contains a shut-off valve 32a and can discharge waste water into an externally mounted receptacle, not shown. The cyclone 28 furthe comprises a substantially centrally located second outlet here shown as a riser or immersion tube 33 which conveys vapors into a condensing means or condenser 34. The riser 33 may but need not be exactly upright and may be installed concentrically with or eccentrically of the cyclone 28.

The condenser 34 comprises a plurality of concentric tubes and the temperature of vapors issuing from the riser 33 is approximately 102° C. The pressure of such vapors is approximately 1.13 bars, i.e., less than in the vapor chamber 26. Such pressure differential insures that the vapors can flow rapidly through the cyclone 28. The radilly extending inlet 31 causes the inflowing vapors to spin about the vertical axis of the cyclone 28 whereby droplets of water, particles of dust and other non-gasiform ingredients impinge upon and slide along the internal surface 36 of the cyclone to be evacuated by way of the outlet 32.

The cyclone 28 insures a very pronounced purification of crude water vapors. Furthermore, due to its aforedescribed position (substantially centrally of the vapor chamber 26), the cyclone 28 is mounted substantially adiabatically, i.e., hardly any heat is lost and the temperature of vapors issuing from the outlet or riser 33 is not appreciably less than the temperature of vapors in the cyclone 28. The exterior of the chamber 26 need not be insulated since there is no loss of heat energy. Due to the kinetics of crude water vapors, the temperature of the internal surface 36 of the cyclone 28 is approximately 1° C. lower than the temperature of vapors in the chamber 26; this insures that droplets of water which are segregated in the cyclone 28 invariably deposit on the surface 36. If desired, the bottom region of the cyclone 28 may be provided with baffles or analogous means for preventing the entry of water droplets, dust and/or other non-gasiform constituents of crude water into the riser 33.

The distillate (i.e., condensate of vapors whch have entered the condenser 34 via riser 33) has a temperature of approximately 102° C. and is caused to flow through a pipe 37 and into the coil of the heat exchanger 19 in order to heat crude water which has already passed through the coil of the heat exchanger 18. The temperature of distillate flowing through the heat exchanger 19 is reduced to approximately 25° C. The heat exchanger 19 discharges cooled distillate into a filling system or the like (not shown) by way of an outlet conduit 38.

The self-sustained separate secondary circulation system or circuit 13 serves exclusively for the transfer and transport of heat. This system comprises a vapor chamber 41 which is mounted on top of the condenser 34. The secondary circulation system 13 may comprise a filler neck, a device for connection to an independent steam source, or a shunt line or conduit 42 which contains a shutoff valve 43 or analogous sealing means and receives vapors from the chamber 26 when the valve 43 is open. Thus, the secondary circulation system 13 uses or can use the same medium (crude water) which is treated in the primary system 12, and such medium can be admitted directly from the primary system when the apparatus is started. Moreover, the shunt line or conduit 42 can be used to sterilize the entire system at an elevated temperature prior to starting of the apparatus 11. This further insures that the apparatus can be rapidly heated to operating temperature and that the medium which is used in the secondary circulation system is generated independently of the primary system 12. The temperature of secondary steam in the vapor chamber 41 is approximately 100° C., and its pressure is approximately 1 bar. Such secondary steam flows through the driven compressor 44 of a heat pump 46 which receives motion from a discrete prime mover, not shown. The compressor 44 raises the pressure of secondary steam to approximately 1.4 bars which results in overheating of secondary steam to approximately 180° C. The temperature of overheated steam (and hence the capacity of the compressor 44) can be reduced by injecting water into the compression area. The compressor 44 is mounted in a conduit 47 which discharges overheated steam into the evaporator 22 wherein the steam gives off heat to primary crude water and is cooled to approximately 108° C. The thus cooled steam assumes a liquid state and is evacuated by way of a conduit 48 which admits the liquid (secondary crude water) into the heat exchanger 18 at a temperature of approximately 99° C. Secondary crude water issues from the heat exchanger 18 via conduit 49 and is admitted into the bottom portion 50 of the condenser 34. Such water is evaporated by primary crude water vapors and rises into the vapor chamber 41.

In the apparatus 11 of FIG. 1, the evaporator 22, the vapor chamber 26, the condenser 34 and the vapor chamber 41 are mounted on top of each other in the interior of an upright cylindrical container or vessel.

It will be seen that the two discrete systems 12 and 13 are associated or intertwined with each other in such a way that the system 12 thermally influences the system 13 and vice versa. in the heat exchanger 18, inflowing crude water of the primary system 12 is heated by the condensed medium in the secondary circulation system 13. The medium (which acts exclusively as a heat carrier means) is thereupon introduced into the condenser 34 and is evaporated as a result of emission of heat by primary crude water. To achieve evaporation of primary crude water in the evaporator 22 (by using the secondary medium only), the temperature level of the secondary medium is raised to one of higher enthalpy by means of the heat pump 46, i.e., by increasing the pressure of the secondary medium. The thermal energy which is available in the heat pump 46 (now at a higher temperature level) increases by approximately the amount of mechanical energy which is supplied to the compressor 44. Since the secondary system 13 is a closed system, there is practically no release of unused thermal energy; this is in contrast with operation of apparatus which use cooling water. Because of the evaporation energy available after passing through the heat pump 46, hot crude water which flows from the heat exchanger 19 into the evaporator 22 can be evaporated (if need be) while the heating device 23 is turned off. As mentioned above, the pressure in the apparatus 11 is between approximately 1 and 1.4 bars. The dimensions of the heating device 23 can be selected in such a way that the apparatus can sterilize itself at a positive pressure of 2.5 bars and at a temperature of 140° C.

The improved method fully satisfies important economic considerations, such as rising costs of energy and shortage of cooling water. For financial reasons, only the heat pump 46 is used to recover energy. As mentioned above, this heat pump is installed in the secondary circulation system 13 and the distillate is transported in a separate primary circulation system 12 which is at least substantially free of moving parts. The cyclone 28 insures a highly desirable and satisfactory purification of vapors; this cyclone is operated by the pressure differential which develops in the two-cycle system. As will be explained in connection with FIGS. 3 to 5, the apparatus may embody additional purification stages upstream and/or downstream of the cyclone 28.

The improved method further insures that the principle of energy recovery by means of a heat pump can be fully realized without affecting the quality of distillate. This is possible because the compressor 44 of the heat pump 46 is installed in the secondary circulation system 13 which latter is used solely for transfer and recovery of heat energy, i.e., no moving parts are needed in the primary system 12 in which the distillate is produced. This insures that the distillate is one of high purity as well as that the cost of distillate is surprisingly low in view of the recovery of energy by means of the heat pump 46. The two systems influence each other only thermally in such a way that the recovered or produced distillate can be cooled to a temperature of approximately 25° C. Therefore, the degree of cooling and loss of heat due to heat being carried off by cooling water is very low. Once the apparatus is started, there is normally no need for supplying any energy except to the compressor 44. If the latter cannot supply all the energy required (i.e., if the design of the compressor 44 is such that it is incapable of furnishing all of the necessary energy), the heating device 23 supplies the balance of energy which is required to raise the temperature of crude water to the boiling point. The major part of or the total heat energy which is needed for evaporation of crude water is supplied by the heat pump 46.

An advantage of filling the secondary system 13 with a medium which is the same as the medium (crude water) in the primary system 12 is that the apparatus can produce, by itself, the medium which is required for energy transfer so that an calcareous deposits or the like which are normally found when the medium filling the secondary system is ordinary water can be avoided in the secondary system as well.

FIG. 2 shows a more compact apparatus 11' wherein the two circuits or systems are even more intimately associated or intertwined with each other. In contrast to the embodiment of FIG. 1, the evaporator 22' and the vapor chamber 26' of the primary system 12' are installed in the interior of a preferably (but not necessarily) cylindrical container or vessel 51 which, in turn, is surrounded by a substantially cup-shaped hood 52. The condenser 34' and the vapor chamber 41' (which form part of the secondary circulation system 13')are mounted in the hood 52. The sequence of steps (i.e., the distilling process and the transfer of heat) in the apparatus 11' is the same as described above. However, the arrangement of certain other parts in the apparatus 11' deviates from the arrangement of corresponding parts in the first apparatus. Thus, the feed line or inlet 16' for demineralized crude water discharges liquid into the bottom portion 53 of the container 51. Distillate is evacuated by way of the conduit 38' which passes through the bottom wall of the container 51. The chamber 54 above the bottom portion 53 of the container 51 constitutes a heat exchanger 19' wherein crude water is heated by distillate flowing in the conduit 38'. The heat exchanger 18' is also installed in the container 51, at a level below the heat exchanger 19', and heats crude water by means of a steam coil wherein the medium of the secondary circulation system 13' flows at a rate which is determined by a flow restrictor 58. The evaporator 22' has pipes 61 for primary crude water; these pipes are concentric with each other and are located above the chamber 54. The pipes 61 are disposed between plates 62 which are secured to the container 51 in such a way that crude water can flow upwardly to fill the container to the level 27'. Crude water rises to the level 27' by flowing along the internal surface of the container 51.

The outlet 32' of the cyclone 28' discharges separated non-gasiform material into the evaporator 22', and its lower or discharge end is located below the level 27'. Thus, waste water is evaporated again, i.e., its mass and its thermal energy are reused. This is particularly desirable when the apparatus 11' is started. Since the pressure in the cyclone 28' is slightly lower than in the evaporator 22', a column of crude water rises in the outlet 32'. The height of such column is a function of the pressure differential between the evaporator 22' and the interior of the cyclone 28'. This column acts as a barrier for vapors in the cyclone 28' and crude water in the evaporator 22'. The immersion tube or riser 33' of the cyclone 28' extends upwardly through and is secured to the ceiling 29' of the container 51; this tube discharges vapors into the space below an intermediate wall 50' of the hood 52. The concentric pipes 64 of the condenser 34' surround the entire or the major part of the container 51. The lower end portions of the pipes 64 are connected to the coil of the heat exchanger 18' in the container 51. The condensate (distillate) of the primary system 12' (the upper level of such condensate is shown at 68) which accumulates in a compartment between the internal surface of the hood 52 and the external surface of the container 51 flows through the coil of the heat exchanger 19' and is evacuated by way of the outlet conduit 38'.

The vapor chamber 41' of the secondary circulation system 13' is disposed between the top wall 67 and the intermediate wall 50' of the hood 52. The intake end of the pipe 47' which contains the compressor 44' of the heat pump 46' is connected with the vapor chamber 41', and the discharge end of this pipe admits overheated medium into the evaporator 22' of the primary system 12'. The reference character 69 denotes the upper level of a condensed halogenated hydrocarbon (e.g., Freon) which fills the secondary circulation system 13'. The halogenated hydrocarbon may evaporate at a pressure of approximately 9 bars and a temperature of approximately 100° C. During passage through the heat pump 46', such medium is compressed to approximately 20 bars which entails a temperature rise of approximately 20° C.

The container 51 is preferably made of glass and its external surface may, if necessary, be coated with a light-reflecting layer to minimize the exchange of heat between the container 51 and the hood 52. Alternatively, or in addition to such coating of the container 51, the internal surface of the hood 52 can be coated in a similar way. Flanges 71 or analogous separable connecting or fastening means are provided to detachably secure the container 51 to the hood 52. Due to the provision of the just described thermal barrier between the container 51 and hood 52, the apparatus 11' need not be provided with a discrete heating device, such as the device 23 of FIG. 1.

The coating at the inner side of the hood 52 and/or at the exterior of the container 51 can be formed by plating or galvanizing. Defective parts can be readily replaced. The embodiment of FIG. 2 is particularly suited for use as a smaller-scale distilling apparatus. It is advantageous if crude water can flow between the wall of the container 51 and the evaporator because this results in an increase of the area of the heat-transferring surface.

An advantage of the apparatus of FIG. 2 is that the heat pump 46' can use a commercially available compressor 44'. The compressor 44' raises the pressure of Freon or an analogous medium from about 7 to about 20 bars, and this entails a temperature rise from 100° C. to 120° C. This presents no problems insofar as the construction of the compressor is concerned. In accordance with presently known proposals wherein the heat transfer medium is water, the compressor raises the pressure by 0.1-0.2 bar which corresponds to a temperature rise of approximately 5° C. In order to achieve higher compression, the prior art proposals teach to compress the liquid prior to evaporation; this is not desirable when the apparatus employs a heat pump. When water is used as a heat transfer medium in the method of the present invention, vapors which pass through the compressor are pressurized by 1-1.4 bar (or more) which corresponds to a temperature rise from approximately 99° C. to approximately 108° C. or more, i.e., almost or more than twice the temperature increases which is achieved in accordance with heretofore known proposals.

Referring to FIG. 3, there is shown an embodiment wherein the vapor chamber (which may be the chamber 26 of FIG. 1 or the chamber 26' of FIG. 2) contains one or more ultrasound generators 72 which are secured to the ceiling (29 or 29') in such a way that they surround the cyclone 28 or 28'. The generators 72 are mounted at a predetermined distance from each other and from the cyclone 28 or 28' (preferably close to the inlet of the cyclone) and are caused to direct ultrasonic waves downwardly, i.e., counter to the direction of flow of vapors toward the inlet 31 or 31' of the cyclone and in parallelism with the vertical axis of the cyclone. The generators 72 may be used together with or instead of one or more additional generators 73 (shown by broken lines) which are installed at the inner side of the upright wall of the vapor chamber 26 or 26'. Thus, crude water vapors rising in the chamber 26 or 26' and entering the cyclone 28 or 28' by way of the inlet 31 or 31' can be irradiated by ultrasonic waves in the axial and/or radial direction of the chamber. Such irradiation of vapors causes the finely dispersed water droplets to coagulate, i.e., to form larger droplets. This enhances the separating and purifying action of the cyclone 28 or 28'.

FIGS. 4a and 4b show a further embodiment wherein the immersion tube or riser 133 of the cyclone (28 or 28') has an enlarged portion 76 the lower part of which is provided with three sources or generators 77 of ultrasonic radiation disposed one above the other at the periphery of the enlarged portion 76. Each source 77 is disposed diametrically opposite a reflector 78 (e.g., a concave mirror) which is mounted in the interior of the enlarged portion 76 so that the source 77 cooperate with the respective reflectors 78 to produce three standing sound waves 79 disposed at three different levels in the interior of the riser 133. Each standing wave has vibration nodes 81 and antinodes 82.

The enlarged portion 76 of the riser 133 further comprises channels 83, 84 which are mounted therein at a level above the sources 77. The channels 83 are located above and register with the nodes 81, and the channels 84 register with the antinodes 82. The dimensions of the enlarged portion 76 are such that the velocity of the rising vapors is preferably less than 0.5 meter per second; this insures relatively long periods of dwell of ascending vapors in the zone which is traversed by the standing sound waves 79. The stream of crude water vapors which travels upwardly in the riser 133 is split up before it enters the channels 82 and 84 whereby the stream portions which traverse the nodes 81 contain a larger number of droplets than those which traverse the antinodes 82. Vapors containing fewer droplets flow through the channels 84 and are fed into the condenser 34 or 34' to be tapped as a high-purity distillate. The vapors which contain a larger number of droplets pass through the channels 83 and are returned into the vapor chamber 26 or 26' or direcly into the riser 133 so that there is practically no loss. Vapors which return into the lower portion of the riser 133 by way of the channels 83 are purified again, and at least a certain percentage thereof enters the channels 84 to be tapped as high-purity distillate.

FIG. 4b shows that the cross-section of the enlarged portion 76 of the riser 133 resembles an elongated rectangle.

FIG. 5 shows a further embodiment of vapor purifying means for use in the apparatus. The purifying means is an electrostatic filter installed in an immersion tube or riser 233 which can be used as a substitute for the riser 33 or 33'. The riser 233 has an outer wall 90 and an inner wall 89, and these two walls define an annular compartment 86 the upper end of which communicates with an annular inlet opening 87. An electrode 88 (e.g., an electrical discharge wire) which passes through a duct 85 and is connected to a source of high voltage (e.g., 20 to 80 kV) extends centrally through the riser 233. The electrode 88 is connected to the negative pole and the inner wall 89 of the riser 233 is connected to the positive pole of the energy source, or vice versa. The thus applied high voltage builds up an electric field whose intensity is sufficient to split up the molecules of water vapors so that such molecules yield positive ions and electrons. Some of the electrons deposit on neutral molecules to form negative ions. Under the influence of the electric field, the negative ions travel to the positive electrode (i.e., to the inner wall 89) and ionize additional neutral molecules as a result of collison with such molecules. When negatively charge molecules impinge upon the inner wall 89, they lose their charge which causes impurities in the vapors and extremely fine water droplets to deposit on the inner wall 89. As the vapors flow upwardly, the thus deposited impurities are entrained in the same direction along the internal surface of the wall 89 and enter the compartment 86 by way of the annular inlet opening 87. The compartment 86 can discharge the admitted material into the vapor chamber 26 or 26' of the evaporator 22 or 22'. This insures further purification of crude water vapors.

It is clear that two or more of the above purifying units (such as the cyclone 28 or 28', the means 72 and/or 73 for irradiating vapors with ultrasonic waves, the means 77, 78 for generating standing sound waves, and the electrostatic filter of FIG. 5) can be used in one and the same apparatus. If two or more different purifying units are used, they may be arranged in series and/or in parallel.

The improved method is susceptible of many additional modifications without departing from the spirit of the invention as long as one of the two associated systems comprises stationary parts and serves to produce distillate from crude water and the other system is a separate self-contained heat carrying system for the recovery of heat by means of a heat pump. Furthermore, the secondary circulation system may utilize media other than crude water or Freon.

It is within the purview of the invention to produce large quantities of distillate which has been distilled once or smaller quantities of high-quality distillate which has been distilled several times by employing two or more primary systems which are connected in parallel or in series. Depending on the construction of the distilling apparatus, the primary systems can be thermally connected with a single secondary circulation system which contains a single heat pump, or each primary system can be connected with a discrete secondary circulation system without a heat pump; in such apparatus, all of the secondary circulation systems have a common heat pump for the recovery of energy.

It is further possible to replace the heat exchanger 18 or 18' with a flow restrictor in the respective conduit of the secondary circulation system. This is advisable when the temperature difference between the evaporator outlet and the condenser inlet is small so that it does not warrant the installation of a complex heat exchanger.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. A method of generating substantially pyrogen-free water from demineralized crude water, comprising the steps of circulating an evaporable heating medium in a closed path between a first and a second heat-exchange zone, including increasing by an increment the heat content of the medium by compressing the latter; introducing crude water into an additional path separate from said closed path and in heat-exchange relationship therewith in said first and second heat-exchange zones at a pressure in excess of atmospheric pressure; releasing vapor from the crude water into an evaporation zone under substantially isobaric conditions satisfying the saturation curve, including transmitting the heat-content increment of the medium to the crude water in said first heat-exchange zone; purifying the vapor in a purifying zone, the purifying step including introducing the vapor into the interior of said purifying zone, and accelerating the vapor during introduction by imparting a rotary motion thereto so that contaminant particles entrained by the vapor are centrifugally removed from the latter, said purifying zone being disposed in said evaporation zone so that the vapor contacts the exterior of said purifying zone prior to the purifying step thereby creating a substantially adiabatic condition due to contact of the vapor with both the interior and exterior of said purifying zone; condensing the vapor to a condensate in said second heat-exchange zone, including withdrawing the heat-content increment from the vapor into the medium; conveying the vapor in said additional path from said first to said second heat-exchange zone due to pressure differential attributable exclusively to the effects of the heat-content increment and without the use of any mechanical device; maintaining superatmospheric pressure throughout said additional path; freely discharging the condensate from said second heat-exchange zone in said additional path, the entire additional path being defined exclusively by stationary components; and recovering the condensate from said additional path as substantially pyrogen-free water.

2. A method as defined in claim 1, further comprising the step of preheating the crude water prior to said releasing step; and wherein said preheating step comprises establishing an exchange of heat between said medium and crude water.

3. A method as defined in claim 1, wherein said medium is water.

4. A method as defined in claim 1, wherein said medium is a fluid other than water.

5. A method as defined in claim 4, wherein said medium is a halogenated hydrocarbon.

6. A method as defined in claim 1, further comprising the step of heating crude water in said first zone by a source of heat energy other than said medium, particularly during initial introduction of crude water into said additional path.

7. A method as defined in claim 1, further comprising the step of admitting waste water separated during said purifying step into said first zone.

8. A method as defined in claim 1, further comprising the step of irradiating the vapor with sound waves prior to said purifying step.

9. A method as defined in claim 1, further comprising the step of establishing and maintaining at least one standing sound wave in the path of purified vapor.

10. A method as defined in claim 1, wherein the vapor in said evaporation zone includes vapor containing a relatively high percentage of water droplets and vapor containing a relatively low percentage of water droplets; and further comprising the step of recirculating vapor containing said relatively high percentage of droplets into said first zone.

11. A method as defined in claim 1, further comprising the step of electrostatically purifying the vapor.

12. A method as defined in claim 11, wherein the step of purifying the vapor in said purifying zone is performed prior to said electrostatic purifying step.

13. A method as defined in claim 1, wherein said transmitting step includes condensing said medium in said first heat-exchange zone and said withdrawing step includes evaporating said medium in said second heat-exchange zone.

14. A method as defined in claim 1; and further comprising the step of preheating the crude water to close to its evaporation temperature prior to said releasing step.

15. A method as defined in claim 14, wherein said preheating step includes effecting heat exchange between the condensate and the crude water.

16. A method as defined in claim 1, wherein said medium is condensed during the releasing step and evaporated during the condensing step, the step of compressing said medium being performed while the latter is in the vapor state.

* * * * *